(12) United States Patent
Keane

(10) Patent No.: US 12,361,534 B2
(45) Date of Patent: Jul. 15, 2025

(54) ENGINEERING COMPONENTS

(71) Applicant: ROLLS-ROYCE PLC, London (GB)

(72) Inventor: Andrew J Keane, Southampton (GB)

(73) Assignee: ROLLS-ROYCE plc, London (GB)

( * ) Notice: Subject to any disclaimer, the term of this patent is extended or adjusted under 35 U.S.C. 154(b) by 346 days.

(21) Appl. No.: 17/967,620

(22) Filed: Oct. 17, 2022

(65) Prior Publication Data
US 2023/0132487 A1     May 4, 2023

(30) Foreign Application Priority Data
Nov. 3, 2021  (GB) ................................ 2115776

(51) Int. Cl.
G06T 7/00      (2017.01)
G06N 3/045     (2023.01)

(52) U.S. Cl.
CPC .......... *G06T 7/0004* (2013.01); *G06N 3/045* (2023.01); *G06T 2207/20084* (2013.01); *G06T 2207/30164* (2013.01)

(58) Field of Classification Search
CPC ...... G06N 3/045; G06N 3/0475; G06N 3/094; G06N 3/096; G06T 2207/20084; G06T 2207/30164; G06T 7/0004
See application file for complete search history.

(56) References Cited

U.S. PATENT DOCUMENTS

| | | | |
|---|---|---|---|
| 2018/0357514 A1* | 12/2018 | Zisimopoulos | G06V 10/764 |
| 2019/0385346 A1* | 12/2019 | Fisher | G06F 40/109 |
| 2021/0034961 A1* | 2/2021 | Lovell | G06F 30/20 |
| 2021/0158570 A1 | 5/2021 | Mohandoss et al. | |
| 2021/0192762 A1* | 6/2021 | Guan | G06T 15/06 |
| 2021/0233656 A1* | 7/2021 | Tran | G16H 20/30 |

(Continued)

FOREIGN PATENT DOCUMENTS

| | | |
|---|---|---|
| CN | 111860593 A | 10/2020 |
| CN | 112950617 A | 6/2021 |

(Continued)

OTHER PUBLICATIONS

Runyuan Guo et al.,"Weld Defect Detection From Imbalanced Radiographic Images Based on Contrast Enhancement Conditional Generative Adversarial Network and Transfer Learning," Feb. 16, 2021, IEEE Sensors Journal, vol. 21, No. 9, May 1, 2021,pp. 10844-10852.*

(Continued)

*Primary Examiner* — Omar S Ismail
(74) *Attorney, Agent, or Firm* — Oliff PLC

(57) ABSTRACT

A computer implemented method of assessing the suitability of a component, including: utilising a Conditional Generative Adversarial Network (cGAN), the cGAN network having an input, a generator and a discriminator; obtaining images or scans of manufactured components for both acceptable and non-acceptable components; training the discriminator of the cGAN with the images representing the acceptable and non-acceptable scans or images of a manufactured component; scanning or imaging a component to be assessed; and inputting the image or scan of a component to be assessed into the discriminator of the cGAN, wherein the output of the discriminator assesses if the scan or image is acceptable for use or not.

13 Claims, 5 Drawing Sheets

(56) References Cited

U.S. PATENT DOCUMENTS

2022/0172050 A1* 6/2022 Dalli ................ G06N 3/047
2022/0343275 A1* 10/2022 Tran ................ G06Q 30/0205
2022/0415683 A1* 12/2022 Stoddard ............. G06N 3/088

FOREIGN PATENT DOCUMENTS

| EP | 3 617 994 A1 | 3/2020 |
|----|--------------|--------|
| WO | 2020/121239 A2 | 6/2020 |
| WO | 2021/257507 A2 | 12/2021 |

OTHER PUBLICATIONS

Yueqing Wang et al.,"An Intelligent Method for Predicting the Pressure Coefficient Curve of Airfoil-Based Conditional Generative Adversarial Networks," Sep. 23, 2021, IEEE Transactions on Neural Networks and Learning Systems, vol. 34, No. 7, Jul. 2023 ,pp. 3538-3550.*

Widad Yossri et al.,"Airfoil type and blade size effects on the aerodynamic performance of small-scale wind turbines: Computational fluid dynamics investigation," Apr. 27, 2021, Energy 229 (2021) 120739, pp. 1-13.*

Masoud Ghasemian et al.,"A review on computational fluid dynamic simulation techniques for Darrieus vertical axis wind turbines," Jul. 15, 2017, Energy Conversation and Management 149 (2017),pp. 90-95.*

Andy J. Keane et al.,"Surrogate Approaches for Aerodynamic Section Performance Modeling," Aug. 29, 2019,AIAA Journal vol. 58, No. 1, Jan. 2020,pp. 16-23.*

Apr. 3, 2023 Search Report issued in European Patent Application No. 22201411.0.

Yossri et al., "Airfoil type and blade size effects on the aerodynamic performance of small-scale wind turbines: Computational fluid dynamics investigation", Energy 229, 2021, pp. 2-15.

Ghasemian et al., "A review on computational fluid dynamic simulation techniques for Darrieus vertical axis wind turbines", Energy Conversation and Management 149, 2018, pp. 87-100.

Arora et al., foilNET: A Convolution based Neural Network for Prediction of Pressure Field around Oscillating Airfoils, 8th International and 47th National Conference on Fluid Power (FMFP), 2020, pp. 1-6.

Wang et a., "An Intelligent Method for Predicting the Pressure Coefficient Curve of Airfoil-Based Conditional Generative Adversarial Networks", IEE Transactions on Neural Networks and Learning Systems, 2021, pp. 1-15.

Kadir et al., "Computational fluid dynamic and thermal stress analysis of coatings for high temperature corrosion protection of aerospace gas turbine blades", Heat Transfer—Asian Research, vol. 48, No. 6, Jun. 20, 2019, pp. 2302-2328.

Mar. 30, 2023 Search Report issued in European Patent Application No. 22201413.6.

Wei Chen, Airfoil Design Parameterization and Otimization using Bézier Generative Adversarial Networks, ResearchGate, Jun. 2020, pp. 1-30.

Apr. 26, 2022 Search Report Issued in British Patent Application No. 2115775.5.

May 3, 2022 Search Report Issued in British Patent Application No. 2115776.3.

Keane et al. "Surrogate Approaches for Aerodynamic Section Performance Modelling", University of Southampton, (2020).

U.S. Appl. No. 17/967,603, filed Oct. 17, 2022 in the name of Keane.

* cited by examiner

ENGINEERING COMPONENTS

This specification is based upon and claims the benefit of priority from UK Patent Application Number 2115776.3 filed on 3 Nov. 2021, the entire contents of which are incorporated herein by reference.

BACKGROUND

Field of the Disclosure

The disclosure relates to the embedding of data within a scan or design image of an engineering component, to improve the analysis by using an artificial intelligence engine. A further aspect of the disclosure is a means of improving the design of an engineering component through using images of scans of engineering components embedded with data relevant to the goals being optimised. Furthermore, it also provides a means to inspect components and discriminate between manufactured or in-service components that are fit for use and those that are not.

Background of the Disclosure

Artificial Intelligence (AI) has been used in a number of fields of image recognition to improve functionality and performance. It is commonly used in fields of photography for recognition of photographs. Artificial Intelligence implies that the system has the ability to learn on its own based upon the information that is input into the system. Such systems are, for example, able to recognize, follow and photograph subjects in a scene completely autonomously. Furthermore, it is possible to improve the quality of images and to even use, in some cases, AI to recreate images based upon input data so that they appear to be real photographs, but have, instead of being taken by a human user, were rather created by an AI system. In order to do this, machine learning algorithms need to find patterns in data, which they then use to generate insights and help the AI system to make better decisions and predictions; thus increasing the chances of the generated images being considered real.

Despite the advancements in other areas of artificial intelligence there has been relatively less use of AI in engineering design and manufacture. The use of artificial intelligence within this field can be used to improve the performance of components or in improvements to the design process for the components. However, in performing any of these tasks the images that are input for processing are generally not ideal; a major factor in this is because the images of the components need to be fully evaluated for the desired performance using computational methods and it is not possible to apply engineering analysis methods directly to images of components. It is therefore desirable to improve this process so that the artificial intelligence can be further used to help design components and can be able to assess manufactured and in-service components based upon design criteria.

SUMMARY OF THE DISCLOSURE

According to a first aspect of the disclosure there is presented a computer implemented method of assessing the suitability of a component, the method comprising:
utilising a Conditional Generative Adversarial Network (cGAN), the cGAN network having an input, a generator and a discriminator;
obtaining images or scans of manufactured components for both acceptable and non-acceptable components;
training the discriminator of the cGAN with the images representing the acceptable and non-acceptable scans or images of a manufactured component;
scanning or imaging a component to be assessed;
and inputting the image or scan of a component to be assessed into the discriminator of the cGAN, and wherein the output of the discriminator assesses if the scan or image is acceptable for use or not.

The scan or image may be of a newly manufactured component.

The scan or image may be of a component that has undergone a number of cycles of use.

The training may be accelerated using transfer learning.

The above method may further comprise determining at least one physical parameter relating to the scan or image to be assessed,
converting the input parameter into a histogram and/or a glyph that represents the value of the physical parameter,
embedding the histogram or glyph into the image or scan of the component to be assessed prior to either the training step and/or the inputting step.

The physical parameters represented by at least one of the histograms and/or glyphs may be derived from computational modelling of the image or scan.

The physical parameters represented by at least one of the histograms and/or glyphs may be derived from direct measurement of the component.

The histogram or glyph may be embedded using a separate colour channel of the scan or design of an engineering component.

A plurality of histograms and glyphs may be embedded into the scan or design of an engineering component, and where each glyph and/or histogram represents a different physical parameter.

The data in the histogram and/or glyph may be scaled.

Computational fluid dynamic modelling or finite element stress analysis may be performed on the scan and the resultant flow field or stress image added to the image or the scan prior to the training and/or the inputting step.

The images or a scan of a manufactured component may relate to a component for a gas turbine engine.

The manufactured component may be a blade.

The manufactured component may be a cast component.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE FIGURES

Embodiments will now be described by way of example only, with reference to the Figures, in which.

DETAILED DESCRIPTION

Figure 1A:
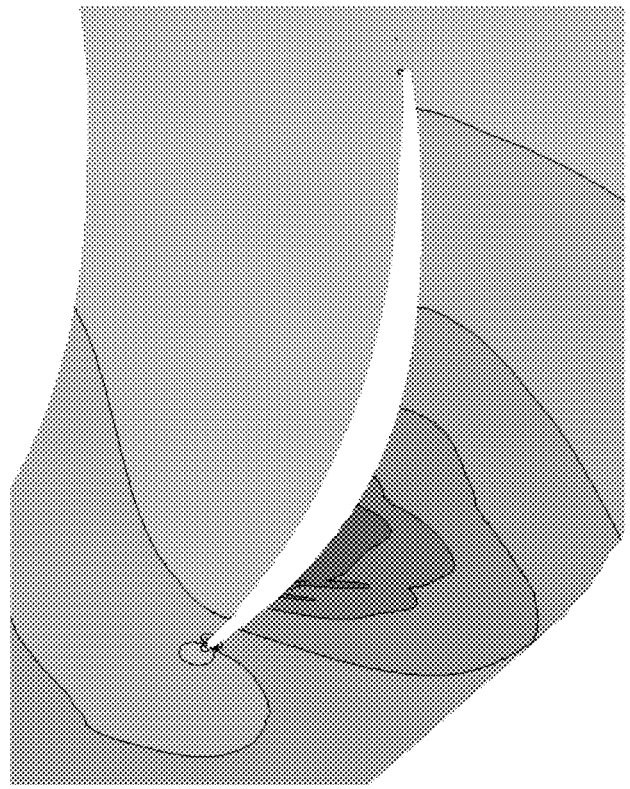
FIG. 1a presents a flow-field image produced using Computational Fluid Dynamics (CFD) of an engineering component according to the prior art.

Aspects and embodiments of the present disclosure will now be discussed with reference to the accompanying figures. Further aspects and embodiments will be apparent to those skilled in the art.

Components and designs of engineering products can be imaged; this can either be through the creation of a computer model which can predict the performance of a potential design via techniques such as CFD; or the scanning/imaging of a formed product. Through these images it is possible to learn and understand behavioural and/or performance characteristics, some of which may be desirable others which may be less desirable or unwanted. An example of one such scan technique is a GOM scan (which is a commercial three dimensional white light scanning system produced by GOM UK Ltd); these scans take an accurate image of the component either after the manufacturing process has been completed and/or after the use of the component over a number of cycles. If the products that are manufactured are imaged a number of times it is possible to build up a database in the form of a collection. By building up a collection of images it is possible to use the images for an artificial intelligence engine to process and interpret the data; this could be in order to determine performance of the component or to improve the design of the component with respect to certain desirable input conditions or to discriminate between components with acceptable and non-acceptable performance. This is because through the use of artificial intelligence processes such as neural network analysis it is possible to determine and build up an appreciation of performance, or damage and/or faults that may be present in manufacturing or that change during the lifespan of the product. As such, it is possible for the system to learn what likely changes may occur to the components during manufacture and/or during operation. This could be used to identify and eliminate potential faults before they become an issue or so that the design of the product can be improved to overcome the limitations.

In manufacturing processes, it is possible to build up a large catalogue of results of scans as components are often made multiple times. Using this catalogue of results, it is possible to interrogate the data that is present within them for a number of different purposes. For example, the data from these collections can be fed into suitable surrogate models, such as response surface models, curve fits, of various types, e.g. radial basis functions, Gaussian Process models, neural networks, support vector machines, etc. From the interpretation of the image and scan data it is possible to speed up the Design Search and Optimization (DSO) process in many fields of engineering, thus leading to improved design and safer and more reliable products. Such design optimisation is most beneficial to be used in fields of engineering that require the use of expensive computer simulations, including problems with multiple goals and multiple domains, such as in the oil and gas industry, or within the fields of automotive or aeronautical engineering. The surrogate models can also be used in dealing with Uncertainty Quantification (UQ) of expensive black-box codes where there are strict limits on the number of function evaluations that can be afforded in estimating the statistical properties of derived performance quantities.

To improve the performance of a neural network used in this context, so that it is able to learn and process the data more quickly it has been found beneficial to add further data to the scans before they are processed by the algorithm. This can be done by converting numerical values that are associated with measured or determined physical characteristics and embedding these values into the images in the form of small geometrical shapes. These small geometrical shapes are often termed glyphs whose size, shape and orientation are used to encode data such that the artificial intelligence system can process it. This additional data can represent important parameters that the system needs to be able to determine rapidly so that it can learn from them. The data that is embedded in the images can be linked to performance or structural or other design characteristics of the component being evaluated. This data can either be calculated or obtained from other tests or estimated using mathematical modelling. For example, this could be data regarding strength, aerodynamic efficiency, shape, damage, drag or any other suitable parameter related to the design that is being analysed. The additional data are embedded into the images that are being evaluated in the form of glyphs and/or histograms, wherein the size of the glyph or histogram is used to represent a value of the parameter being considered. The data in the histogram or glyph can be scaled so that can be interpreted accurately by the artificial intelligence system. An example of this would be to create a glyph as a sector of a circle whose sector angle is proportional to the product performance, where for example a small arc section represents high modelled aerodynamic performance and a larger arc represents lower aerodynamic performance. It may be possible to embed more than one data set into the image; this could relate to different desirable considerations that need to be accounted for by the neural network for example aerodynamic performance and damage considerations of the component. The histogram or glyph may be included in an area of the image that is not used to display other important aspects of the design. For example, this could be embedding the additional data in areas around the periphery of the design being processed.

Figure 1B:
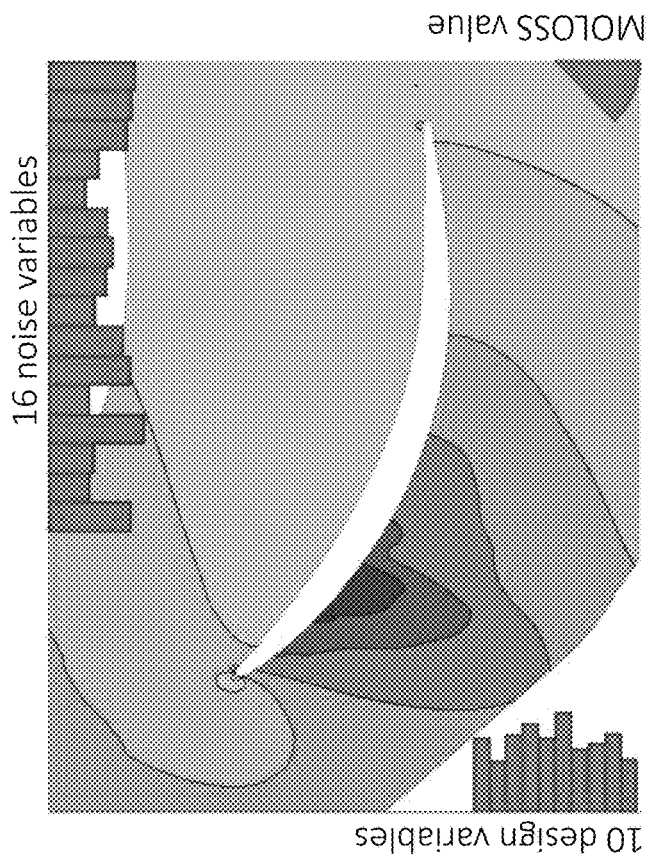
FIG. 1b presents an equivalent flow-field image of an engineering component having embedded physical data according to the present disclosure.

An example of such data overlay is shown in FIG. 1a and FIG. 1b, which represents a cross section of a blade used in a gas turbine engine according to the prior art and one in which data has been embedded, respectively. Both figures show the section blade and the modelled pressure field that surrounds the blade. FIG. 1a presents this image of the blade according to the prior art in which no further data has been added to the blade. The use of such an image can be processed using AI systems, however, the burden on the system is greater as interpreting shape or performance characteristics directly from an image without embedded data is inaccurate and error prone. In FIG. 1b the image has been manipulated to include the extra data in the form of both histograms and glyphs. These data are embedded into the image using any suitable means as would be apparent to the person skilled in the art; one such approach is described later. The histogram in the lower left corner of this image represents design variables of the image. The design variables represent 10 shape control values that control the section shape, thickness, curvature, etc., and when appropriately chosen can help control the performance of the blade and its ability to withstand damage in service. The histogram in the upper right corner represents damage shape control parameters that can be used to represent likely damage that may be experienced by the blade during its operation. These are so called noise variables and correspond to 16 values regarding the controls for damage. These are used to control the shape, orientation and size of small pockets applied to the surface of the blade which mimic those caused by erosion and wear in use.

With these two data sets embedded in the image it is possible to extract the information required so that CFD can be carried out on the image or design of the component to calculate the performance metrics of the blade. The glyph in the lower right corner of the image represents this calculation in the form of the MOLOSS performance factor for the component. In this representation the size of the portion of the semi-circle in the glyph is indicative of performance: the smaller the section of semi-circle the better the performance factor is. The additional information is coloured prior to being embedded so as to present the information within the glyph and/or histogram in a distinct differentiating colour. The extra data can be embedded pixel wise into the images. This allows the artificial intelligence system to be able to readily identify the data and to capture it for analysis. The colours of the additional information may, as is the case in FIG. 1b, be represented in colours that are not used within the image, such that the information can be more readily interpreted by the computer system. For example, it uses the red channel to embed the resulting shape into a flow field prediction where the colour map in use is predominantly blue/green. This method of adding data to the scan images allows for faster training of neural network approaches. This is because the system can be taught which values are desirable and as such can identify patterns associated with these values because they are notably different between otherwise similar images. The use of embedded data can also allow for the rapid and accurate interpretation of synthetically generated designs proposed by the AI system since the analysis program does not need to interpret a complex curved aerofoil shape directly, but instead can analyse the data presented in the histograms and glyphs directly. As such the burden on the AI system is reduced. To do this the relevant areas of the image are isolated using conventional photo editing processes that would be familiar to those skilled in the art. It is then a straightforward matter to count the pixels within the glyph or histogram bar to establish its size and hence the equivalent parameter value.

The case presented focuses on the performance related to a turbine compressor blade and considerations affecting such a system, however, this approach can be used for the design and analysis of other components. In such cases the data added into the histograms and glyphs will represent desirable parameters associated with the component. For example, corrosion and flow through a pipe system, or alternatively the histogram could represent strength, and strain values in the component, or any other such desirable value as would be apparent to the person skilled in the art.

Figure 2:
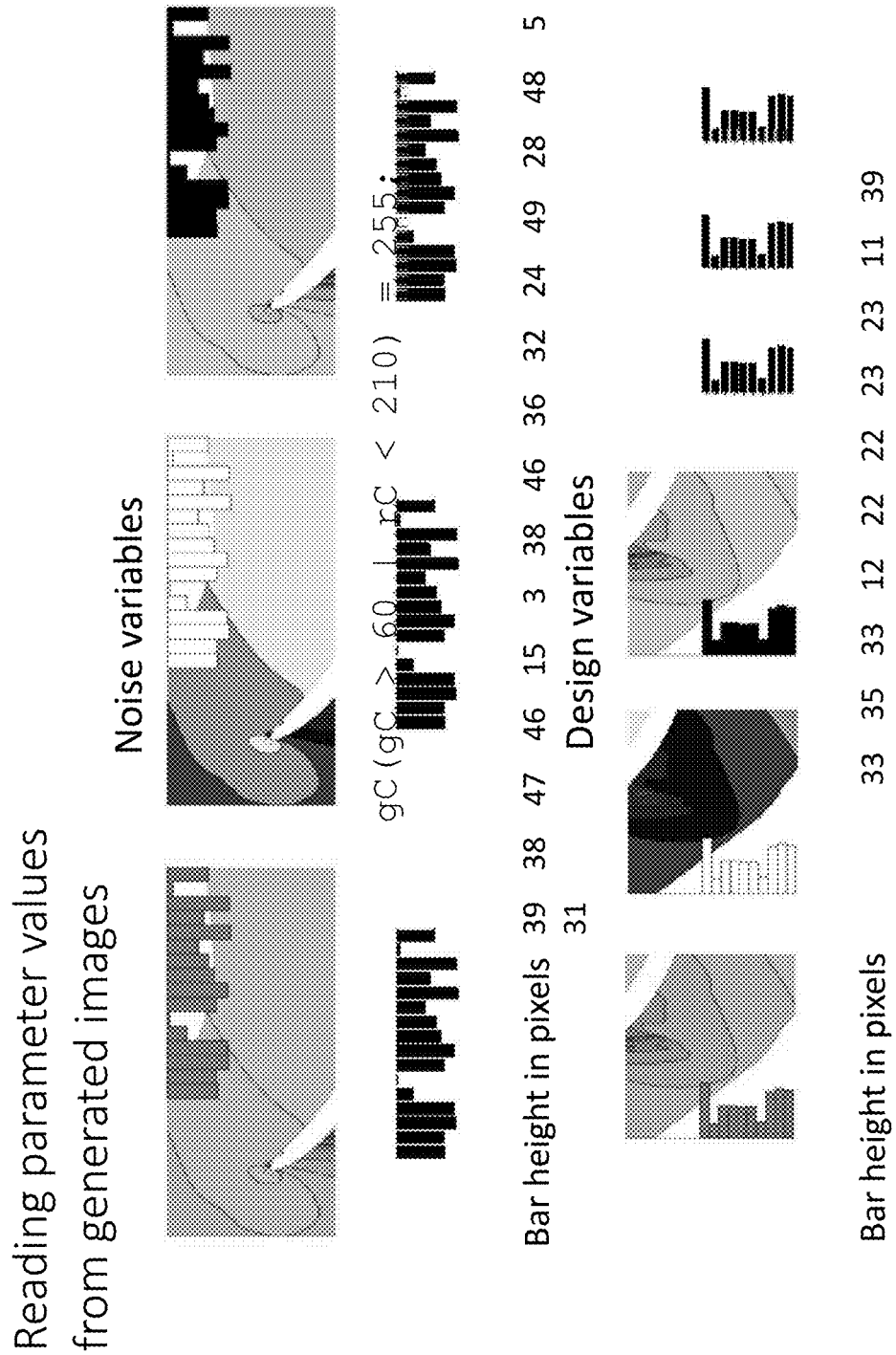
FIG. 2 presents a decoding approach used in determining numerical values from histograms or glyphs embedded in an image of a design.

The figure in FIG. 2 illustrates the process of extracting the histogram bars. First the Noise variables histogram is cropped out from the rest of the image (I)
topBar=I(1:fix(size(I, 1)/2), fix(size(I, 1)/3):end, :);

The green channel is blanked out by replacing all values that correspond to the following condition to 255 (white)
nvars=16;
rC=topBar(:, :, 1);
gC=topBar(:, :, 2);
gC(gC>60|rC<210)=255;

where gC is the green channel matrix and rC is the red channel matrix. This leaves us only with an image matrix that represents the bars. Next, the position of the centre of the bar is identified, based on the fact that there are 16 bars for the noise variables, whilst the width of all bars in total is extracted from the image matrix by detecting the last bar on the left, knowing that the first bar on the right is always positioned in the topmost right corner.
wi=find(min(gC)<40);
bwi=(wi(end)−wi(1)+2)/(nvars);
mids=wi(1)+bwi/2−1:bwi:wi(end)−bwi/2+1;

Next, a tolerance around the centre of each bar is determined. This produced upper and lower limit for each bar, which lies well within the bar.
lmids=mids+3*bwi/10;
umids=mids−3*bwi/10;
mids=round(mids);
umids=max(1, round(umids));
lmids=min(size(gC, 2), round(lmids));
nmids=[mids; lmids; umids]';

At the end of the process, there are 16 middle positions, 16 left and 16 right positions. Proceeding in a loop from one to 16, the number of black pixels in each left-right interval are counted, recording the position of the lowest black pixel along the width of the interval.

```
nv = zeros(nvars, 1);
for i = 1 : nvars
    p = gC(:, nmids(i, 3) : nmids(i, 2));
    nv(i) = length(find(min(p, [ ], 2) < 40));
end
```

The same process is repeated for the design variables which are represented by histograms in the lower left corner.
leftBar=I(fix(size(I, 1)/2): end, 1: fix(size(I, 2)/3), :);
nvars=10;
rC=leftBar(:, :, 1);
gC=leftBar(:, :, 2);
gC(gC>60|rC<210)=255;

The process of extracting the MOLOSS value glyph is similar, however once the channels are separated, the number of pixels in the entire glyph area is counted and recorded. This gives us better resolution as one value is represented with significantly higher amount of pixels.

```
sector = I(fix(size(I, 1) / 2) : end, fix(2*size(I, 2) /3 ):end, :);
rC = sector(:, :, 1);
gC = sector(:, :, 2);
gC(gC > 60 | rC < 210) = 255;
mloss_sector = length(find(gC < 200));
if isempty(dmids)
    wi = find(min(gC, [ ], 2) < 40);
    bwi = (wi(end) − wi(1)+2) / nvars;
    mids = wi(end)+1 − bwi/2: −bwi : wi(1) + bwi/2 − 1;
    lmids = mids + 3*bwi/10;
    umids = mids − 3*bwi/10;
    mids = round(mids);
    lmids = min(size(gC, 1), round(lmids));
    umids = max(1, round(umids));
    dmids = [mids; lmids; umids]';
end
dv = zeros(nvars, 1);
for i = 1 : nvars
    p = gC(dmids(i, 3) : dmids(i, 2), :);
    dv(i) = length(find(min(p,[ ],1) < 40));
end
```

Variables nv, dv and moloss now contain the pixel counts for noise and design variables and MOLOSS.

Figure 3:
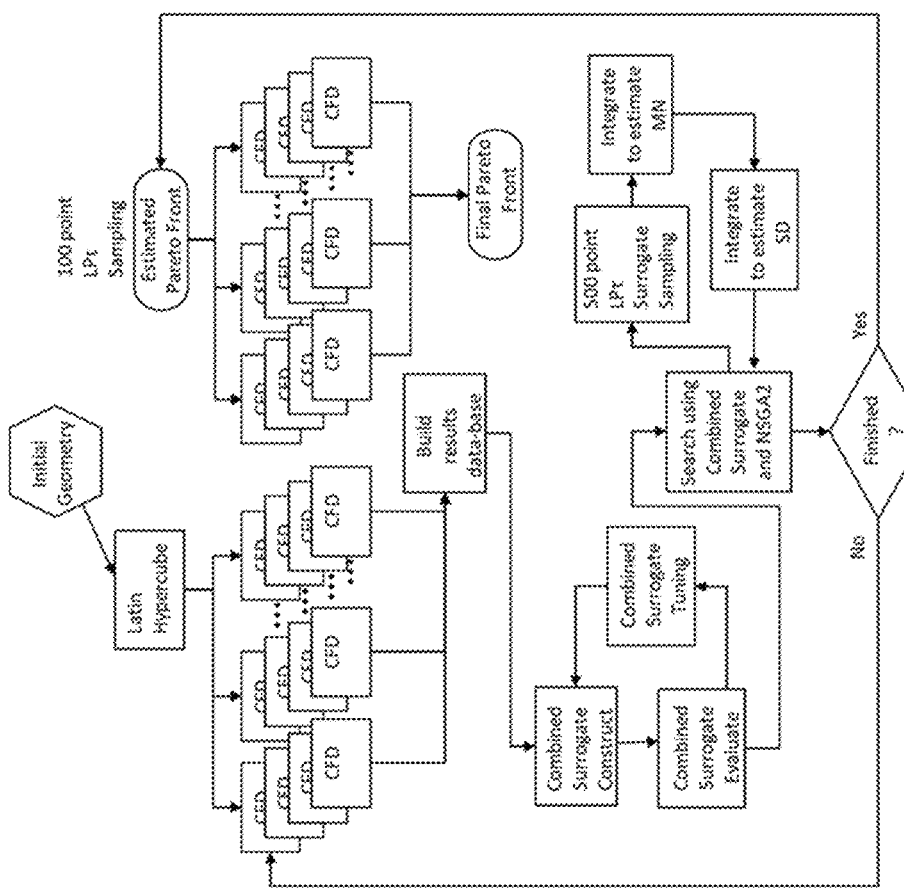
FIG. 3 presents a combined surrogate approach used in determining performance of a design according to the prior art.

FIG. 3 presents a schematic example of a means of generating data for controlling a search for improved designs according to the disclosure. The initial input sample data over the design and noise parameters is created through a Latin hypercube, which is used to generate near-random samples from the data ranges being considered. If processing an existing data set then the step of including a Latin hypercube can be omitted. The data can then undergo a series of computational fluid dynamic calculations on the resulting geometries to model their behaviour. This step can be changed to simulate the modelling of the values that are desired for consideration in the final design of the component. In the case of computational fluid dynamic calculations these can be for the input of multiple differing designs featuring geometry changes or the presence of damage or manufacturing uncertainty. To perform the full set of calculations the data set can be fed into a Reynolds averaged Navier Stokes CFD Solver. The output data from these calculations is compiled to build a database of performance values. The images in the database are enhanced by embedding the original input data and the resulting performance data using histograms and glyphs as previously noted in the disclosure. The results from this database are then fed into a combined surrogate construction. The surrogate can take the form of a neural network derived cGAN as described elsewhere in this disclosure. The combined surrogate is used to reduce the computational burden on the computer to run the calculation on the dataset. With the surrogate model constructed it is then evaluated and tuned until the surrogate model is satisfactory for the data and for running the final calculations. Clearly, if the surrogate can accurately model the underlying aerodynamic performance it will allow suitably accurate statistics to be computed, albeit at the cost of sampling multiple times. To begin with, all data are made available to the surrogate construction and tuning process. The quality of the surrogate is key to obtaining a calculation of worth. As such further models should be used and the surrogate updated to obtain better results from the calculations. With a complete surrogate model, the data can be searched. In the example a multi-objective evolutionary NSGAII search was used to deliberately construct a trade surface (Pareto front) adopting both direct and surrogate assisted approaches. However, as the skilled person will appreciate there are a number of appropriate searches that could be used depending upon the requirements of the component and what is being searched and evaluated. A potential design can be evaluated at any point during the search. In the example LPT sampling is used to carry out UQ across the noise variables in the available surrogate and then feed these into the classic NSGAII multi-objective DSO method to try find the Pareto front of mean loss versus standard deviation in loss. Finally, 500 point low discrepancy sequence sampling over the noise variables can be carried out on the surrogate, at any desired set of design variables, so as to return the desired predictions of mean and standard deviations of performance. Once all of this has been completed there is a determination from this if the process is completed, if the process is not completed the data are fed back to perform more CFD calculations, such that a newly refined surrogate model can be created and the process repeated. If the search is deemed to be of suitable quality, then these results are used by the DSO method to find the best Pareto front of mean versus standard deviation for the given surrogate. To do this the completed data are run through more CFD calculations. In doing so this takes a Pareto front estimate and then uses the CFD calculations on the data for the estimate to produce a final Pareto front. As the skilled person will appreciate any suitable number of CFD simulations can be fed into the system. The number will be dependent upon the computational and time resources available to do the work and on the required accuracy of the modelling which may vary depending upon the type of application that it is used for. The above described method is suitable for use in design optimisation for a blade in a gas turbine engine.

By building up a library of images such as these for components they can be inputted into a conditional Generative Adversarial Network (cGAN) system to process. The resulting cGAN can act as the surrogate in the previously described process, or to simply generate new and novel designs worthy of further investigation or to discriminate between good and poor geometries when classifying parts. The cGAN training process compares the data between images to learn how to optimise the design or performance of the component. Using such a system it is possible, with the embedded data, to create optimised designs for engineering components in an improved and faster way. This is because the method of embedding data to the scan images allows for faster and more accurate training of neural network approaches for use as surrogates, generators or discriminators; this is because it has the advantage of the images having the extra data from the glyphs and the histograms within the figures. Additionally, the use of the embedded information allows for the rapid and accurate interpretation of synthetically generated designs proposed by the AI system since one does not need to interpret a complex curved aerofoil shape directly, but instead the generated glyphs are analysed directly as previously described. Through this it is possible to use data from scans of real components and tests to teach the system what is desirable, such that it is able to create designs for components that would overcome associated problems or be more tolerant to the types or conditions of operation.

Figure 4:
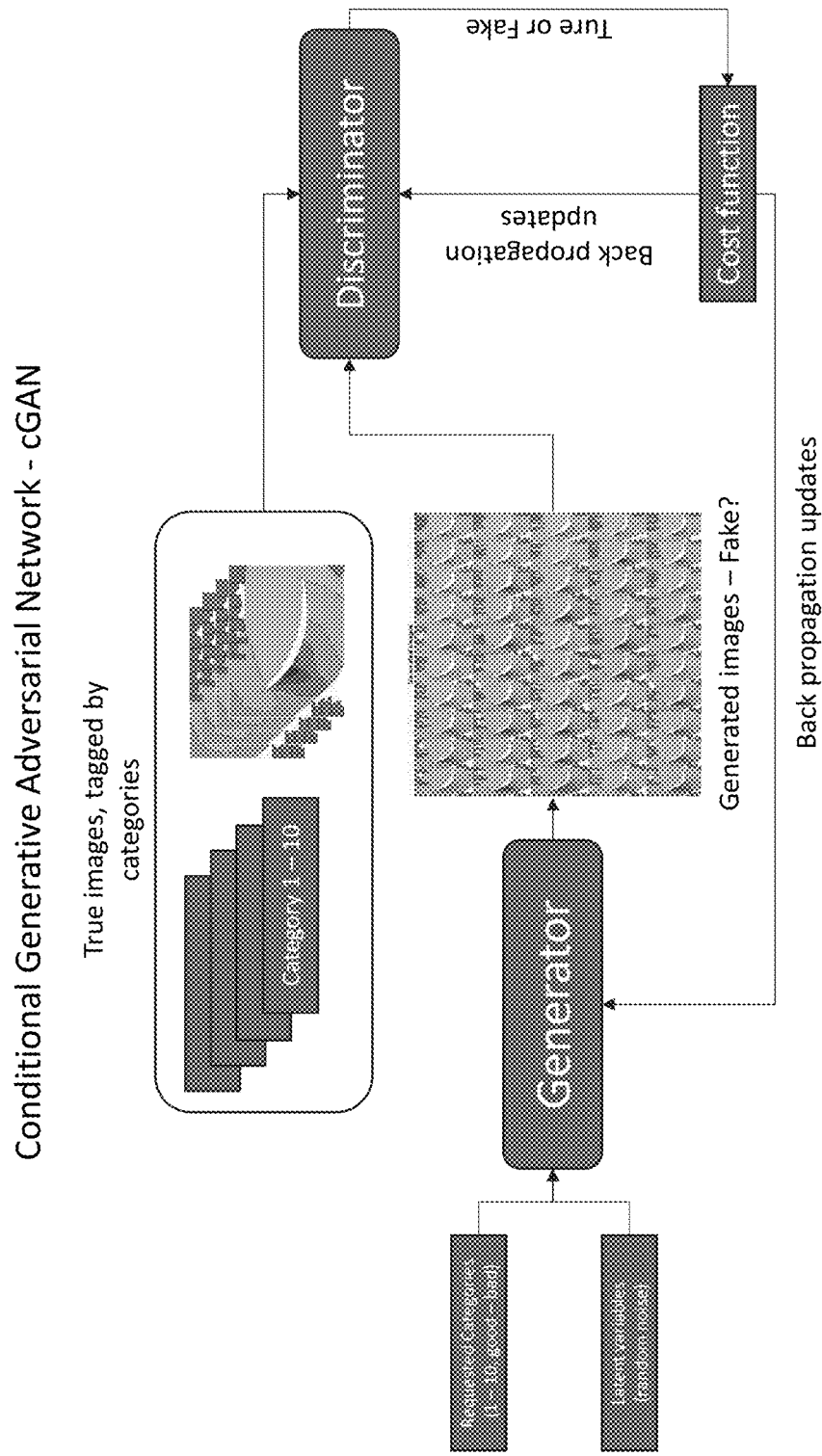
FIG. 4 presents a schematic of the process steps of a conditional general adversarial network (cGAN) AI system, here shown applied to the images presented in FIG. 1b.

FIG. 4 presents a schematic of a conditional general adversarial network. These types of networks have an advantage as they take account of labels during the training period. In the use of this type of neural network real or CFD generated images are fed into a discriminator; the images in this case represent the scans or analysis-based designs of the engineering product whose design is to be improved. A generator is also present within the network; the generator is responsible for generating new geometry and data, which is hopefully indistinguishable from the real data that is fed into the discriminator. The generator is provided with a desired label and random array of latent variables as input, the network then generates new data having the same structure as the training data that corresponds to the same input label. The data or images from the real-world data and the generated data or images from the generator are then fed into the discriminator. The discriminator when provided with batches of labelled data containing samples from both the training data in the form of the real images and generated data originating from the labelled data but created by the generator, attempts to classify the data as "real" or "generated". The network is trained in a zero-sum or adversarial manner, such that improvements in the discriminator come at the cost of a reduced capability of the generator, and vice versa. In order to train a conditional generative adversarial network, it is important to train both the generator and the discriminator simultaneously. This allows it to maximise the performance of both as it trains the generator to create data that is able to "fool" the discriminator whilst training the discriminator to distinguish between the real inputted data and the generated data. In order to maximize the performance of the generator, it is important to maximize the loss of the discriminator when provided with the generated labelled data. This is because the objective of the generator is to generate labelled data that the discriminator classifies as "real".

However, it is also necessary to maximize the performance of the discriminator, and to minimize the loss of the discriminator when given batches of both real and generated labelled data. This is because the objective of the discriminator is to not be "fooled" by the generator. These two strategies should result in a generator that generates convincingly realistic data that corresponds to the input labels and a discriminator that has learned strong feature representations that are characteristic of the training data for each label.

An example of the implementation of the cGAN is described below. In this case the MathWorks Inc. Matlab environment and libraries have been used to implement the cGAN following the existing state of the art:

```
% Define the Generator deep network
dlnetGenerator = defGenerator(embeddingDimension, numClass, ...
    numLatentInputs, projectionSize, filterSize, numFilters, strideGenerator);
% Define the Discriminator deep network
dlnetDiscriminator = defDiscriminator(imSize, embeddingDimension, numClass,
filterSize, numFilters, strideDiscriminator, lastLayer);
% create Validation latent variable set - tests images per class. These
% will be evaluated during training to check the training quality
numValidationImagesPerClass = 5;
ZValidation = 2.*rand(s.numLatentInputs, ...
            numValidationImagesPerClass * numClass, 'single') - 1;
TValidation = single(repmat(1:numClass, [1 numValidationImagesPerClass]));
dlZValidation = dlarray(ZValidation,'CB');
dlTValidation = dlarray(TValidation,'CB');
% begin training
while epoch < numEpochs
    % Files - contain the filenames of all images in the database
    % Here we are shuffling the order of these at each epoch
    shuffleIndex = randperm(length(Files));
    cFiles = Files(shuffleIndex);
    cLabels = labels(shuffleIndex);
    while true
        % Read next batch of images. The size of miniBatch can be a
        % pre-defined constant or is adjusted by an automatic process to
        % maximize the number of images in a batch that fit in the GPU
        % memory
        [Images, outIndex] = minibatch(cFiles, miniBatchsize, ...
        imSize, downloadFolder, inIndex);
        % break this loop if no more images to read
        if isempty(Images)
            break;
        end
        dlX = single(cat(4, Images{:}));
        dlX = rescale(dlX, -1, 1,'InputMin', 0, 'InputMax', 255);
        dlX = dlarray(dlX, 'SSCB');
        dlT = single(cat(1, cLabels(outIndex)));
        dlT = dlarray(dlT', 'CB');
        % Generate latent inputs for the generator network. Convert to
        % dlarray and specify the dimension labels 'CB' (channel, batch).
        % If training on a GPU, then convert latent inputs to gpuArray.
        Z = randn(numLatentInputs, min(miniBatchSize, length(outIndex)),'single');
        dlZ = dlarray(Z,'CB');
        if contains(s.executionEnvironment, "gpu")
            dlZ = gpuArray(dlZ);
            dlX = gpuArray(dlX);
            dlT = gpuArray(dlT);
        end
        % Evaluate the model gradients and the generator state using
        % dlfeval and the modelGradients function listed at the end of the
        % example.
        [gradientsGenerator, gradientsDiscriminator, stateGenerator, ...
            scoreGenerator, scoreDiscriminator] = dlfeval(@modelGradients, ...
            dlnetGenerator, dlnetDiscriminator, dlX, dlT, dlZ, flipFactor);
        dlnetGenerator.State = stateGenerator;
        % Update the discriminator network parameters.
        [dlnetDiscriminator,trailingAvgDiscriminator, ...
                trailingAvgSqDiscriminator] = ...
                adamupdate(dlnetDiscriminator, gradientsDiscriminator, ...
                trailingAvgDiscriminator, trailingAvgSqDiscriminator, iter, ...
                learnRateDiscriminator, gradientDecayFactor, ...
                squaredGradientDecayFactor, 1e-8);
        % Update the generator network parameters.
        [dlnetGenerator,trailingAvgGenerator,trailingAvgSqGenerator] = ...
                adamupdate(dlnetGenerator, gradientsGenerator, ...
                trailingAvgGenerator, trailingAvgSqGenerator, iter, ...
                learnRateGenerator, gradientDecayFactor, ...
                squaredGradientDecayFactor, 1e-8);
        % image I contains the validation images structured in tiles
```

```
        dlXGeneratedValidation = predict(dlnetGenerator, dlZValidation, ...
            dlTValidation);
        I = imtile(extractdata(dlXGeneratedValidation) , ...
            'GridSize',[numValidationImagesPerClass numClass]);
    end
end
```

Figure 5:
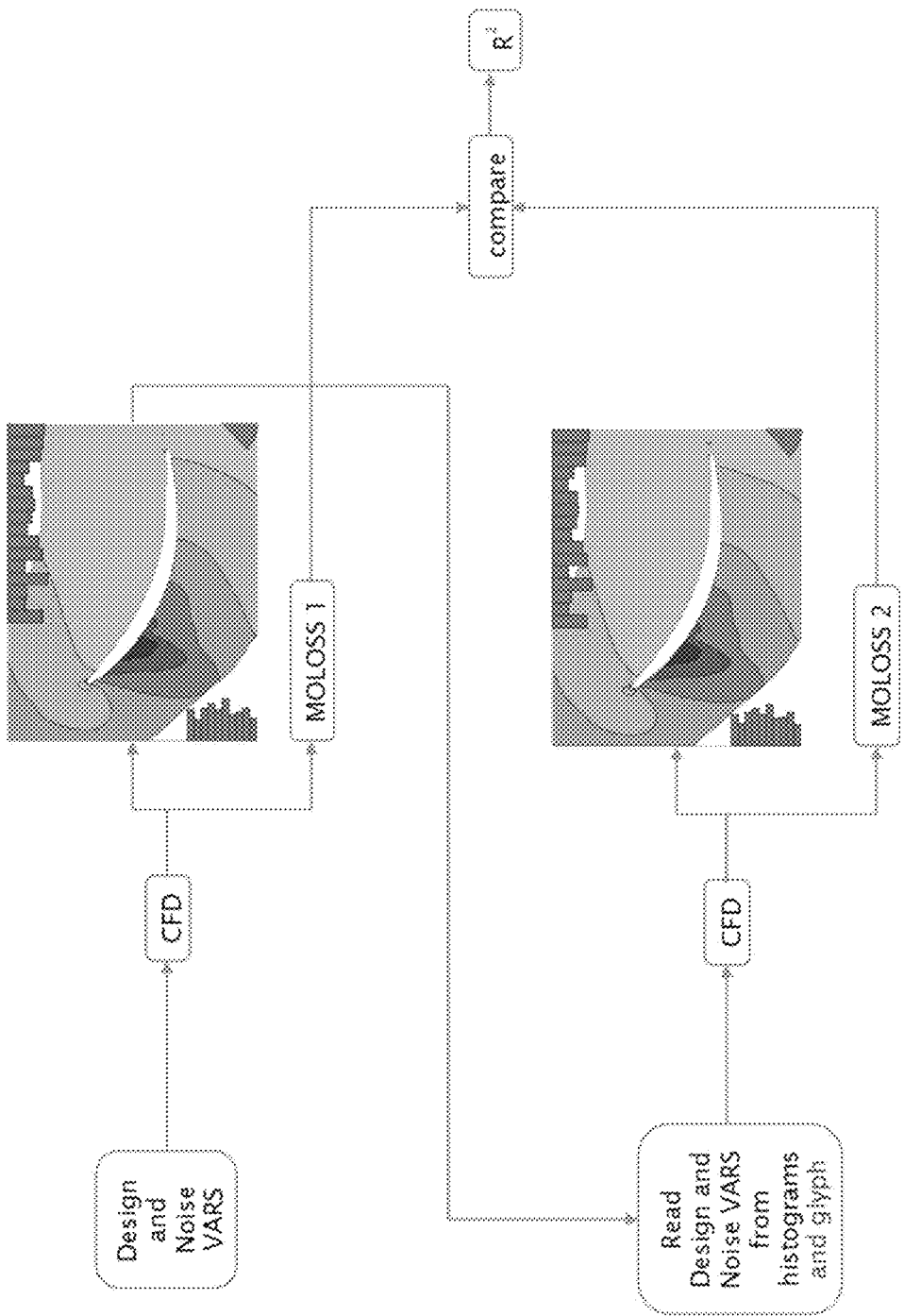
FIG. 5 presents an example of a means of testing the accuracy of the embedding process by comparing the AI generated images with CFD based analysis. MOLOSS is the relevant performance metric being assessed in this example.

FIG. 5 presents an example of a testing process that is used to determine the accuracy of the design data embedding process. In this example the component to be modelled, which has already had data regarding the noise and the design variables in the form of histograms and performance as a glyph embedded in its image. In the example as shown in FIG. 5 the component is a gas turbine blade and the histograms as discussed above relate to noise regarding the damage variables and design variable that regard the tolerance to damage. With these histograms regarding the damage performance the data is then fed into the computational fluid dynamic modelling software. The design variables, noise variables and performance factor derived from the CFD modelling can then be embedded into the CFD derived image and the two images compared. More importantly the performance factor can be directly compared to that decoded from the glyph present in the cGAN generated image. This allows a direct and simple assessment of the accuracy of the cGAN generated image as compared to derived from CFD using conventional means.

The above method of training a discriminator within a cGAN can also be used within a manufacturing process to determine or check a component for suitability for purpose after manufacture or after a period of use. The potential of such would lead to greater safety of the overall assembled machine, as well as potentially reducing the amount of waste that is produced by the replacement of serviceable components. In doing so the component is imaged using any suitable imaging scanning technique, such as, for example, those discussed above, or x-ray imaging or photography. The person skilled in the art would appreciate that other imaging techniques are available. The image/scan of the component is then fed into discriminator as discussed above. However, unlike in the previous section in which the discriminator is taught to learn between real and fake generated images, instead in this case it is used to determine if the processed shape would pass as acceptable for use within the parameters of training data for acceptable images. The discriminator is fed a number of images having both acceptable and unacceptable designs and dimensions during its training, so that it learns what values and shapes are required for an acceptable component. The number of images fed into the system for training will depend on the nature and complexity of the component being imaged. As such, the discriminator after training is used to make decisions based on what it has learnt of acceptable images during its training phase. If the scan passes the discriminator and is classed as an acceptable image, then it is deemed that the component is within a set of tolerances that are acceptable and as such is suitable for use on the larger complex component. If the image is rejected by the discriminator by not being classed as an acceptable image, then such a component would fail the inspection test and should not be used on the larger complex component. This imaging and classification can be done after fabrication and/or after a number of cycles of use. In order to speed up the process and to increase the accuracy and reliability of the component sentencing, histograms as discussed above can be added to the scans/images to represent key physical parameters and considerations that need to be accounted for by the system. Depending upon whether the image is of a newly formed component or a used component the values stored within the histogram may be the same or may differ. The values in the histograms and glyphs may relate to one or more of: performance, damage, size, corrosion, drag, or geometric constraints and any other suitable parameter that would be apparent to the person skilled in the art. As discussed above the histograms and glyphs may be represented in colours that do not feature on the colour scale of the original image. The scan data may be the original photo or may have been further processed by for example performing a suitable modelling on it. For example, this may be a flow field modelling as shown in FIGS. 1a and 1b.

In the case of a blade for a gas turbine engine. The blade undergoes a GOM scan, which is performed after manufacturing and/or after a period of use. These scan images are then fed into the AI discriminator system. The system has been trained to recognise, depending upon the stage of the scanning what is an acceptable newly formed blade and/or what is an acceptable after the period of flight which the scan has been taken. This training is performed by feeding a suitable number of images into the system that represent the different allowable variables for the performance. As the skilled person would appreciate for different systems and different scans the number of scan images which allow for the parameters of freedom of the components. However, for the case of a blade in a gas turbine engine the number of input images for training would be several tens of thousands of images of both acceptable and not acceptable blades. This number could be reduced however by using a previously trained cGAN system built using computational data as described above, using the approach known in the literature as "transfer learning" where the discriminator begins its training from the state previously established during cGAN training. Once the system has been trained, new scan images as discussed above are fed into the discriminator to assess whether the image is acceptable or not acceptable. If the image is classed as acceptable, it means that the scanned component lies within the tolerances allowed by the system as a result of the training that the computer has undergone. The image may be processed as a pure scan. Alternatively, the images may have additional information added to the scans before they are processed in order to help the system process the information. This for example in the case of a blade for a gas turbine engine may be a flow-field image produced using Computational Fluid Dynamics (CFD). In addition to this or in replacement to the flow field image further information such as those discussed above can be added in the form of histograms and/or glyphs which can represent physical parameters such as performance factors, damage factors as discussed above. The presence of the extra data helps the system process the scans and makes the classification of the images as being pass or fail more accurate. The additional data can be presented in different colours to those used in the scan so that the system can more easily determine the information contained.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A computer implemented method of assessing the suitability of a component, the method comprising:
    utilising a Conditional Generative Adversarial Network (cGAN), the cGAN network having an input, a generator and a discriminator;
    obtaining images or scans of manufactured components for both acceptable and non-acceptable components;
    training the discriminator of the cGAN using transfer learning, with the images representing the acceptable and non-acceptable scans or images of a manufactured component;
    scanning or imaging a component to be assessed;
    inputting the image or scan of a component to be assessed into the discriminator of the cGAN, wherein the output of the discriminator assesses if the scan or image is acceptable for use or not;
    determining at least one physical parameter relating to the scan or image to be assessed;
    converting the physical parameter into a histogram and/or a glyph that represents the value of the physical parameter; and
    embedding the histogram or glyph into the image or scan of the component to be assessed prior to either the training step and/or the inputting step.

2. The computer implemented method according to claim 1, wherein the scan or image is of a newly manufactured component.

3. The computer implemented method according to claim 1, wherein the scan or image is of a component that has undergone a number of cycles of use.

4. The computer implemented method according to claim 1, wherein the training is performed using transfer training.

5. The computer implemented method according to claim 1, wherein the physical parameters represented by the histograms and/or are derived from computational modelling of the image or scan.

6. The computer implemented method according to claim 1, wherein the physical parameters represented by at least one of the histograms and/or glyphs are derived from direct measurement of the component.

7. The computer implemented method according to claim 1, wherein the histogram or glyph is embedded using a separate colour channel of the scan or design of an engineering component.

8. The computer implemented method according to claim 1, wherein a plurality of histograms and glyphs are embedded into the scan or design of an engineering component, and where each glyph and/or histogram represents a different physical parameter.

9. The computer implemented method according to claim 1, wherein the data in the histogram and/or glyph are scaled.

10. A computer implemented method of assessing the suitability of a component, the method comprising:
    utilising a Conditional Generative Adversarial Network (cGAN), the cGAN network having an input, a generator and a discriminator;
    obtaining images or scans of manufactured components for both acceptable and non-acceptable components;
    training the discriminator of the cGAN using transfer learning, with the images representing the acceptable and non-acceptable scans or images of a manufactured component;
    scanning or imaging a component to be assessed; and
    inputting the image or scan of a component to be assessed into the discriminator of the cGAN, wherein the output of the discriminator assesses if the scan or image is acceptable for use or not,
    wherein computational fluid dynamic modelling or finite element stress analysis is performed on the scan and a resultant flow field or stress image is added to the image or the scan prior to the training and/or the inputting step.

11. The computer implemented method according to claim 1, wherein the images or a scan of a manufactured component relate to a component for a gas turbine engine.

12. The computer implemented method according to claim 11, wherein the manufactured component is a blade.

13. The computer implemented method according to claim 1, wherein the manufactured component is a cast component.